United States Patent
Venkatesh

(10) Patent No.: US 9,563,930 B2
(45) Date of Patent: Feb. 7, 2017

(54) TECHNIQUES FOR CLEARING A SHARED SURFACE

(71) Applicant: INTEL CORPORATION, Santa Clara, CA (US)

(72) Inventor: Abhishek Venkatesh, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 234 days.

(21) Appl. No.: 14/319,452

(22) Filed: Jun. 30, 2014

(65) Prior Publication Data

US 2015/0379669 A1    Dec. 31, 2015

(51) Int. Cl.
G06T 1/00    (2006.01)
G06T 1/20    (2006.01)

(52) U.S. Cl.
CPC ..................... *G06T 1/20* (2013.01)

(58) Field of Classification Search
None
See application file for complete search history.

(56) References Cited

U.S. PATENT DOCUMENTS

| 8,395,632 | B2 * | 3/2013 | Misra | G06F 9/30025 345/541 |
| 2009/0295816 | A1 * | 12/2009 | Kallio | G06T 15/005 345/553 |
| 2013/0279877 | A1 * | 10/2013 | Boak | H04N 5/917 386/231 |

\* cited by examiner

*Primary Examiner* — Peter Hoang

(57) ABSTRACT

Various embodiments are generally directed to an apparatus, method and other techniques to determine that a shared surface is shared between a first application and a second application, determine that a fast clear operation has been performed on the shared surface, the fast clear operation comprising clearing one or more locations of one or more buffers. Further, various embodiments may include writing pixel value information to the one or more locations of the one or more buffers and performing a resolve operation on the shared surface.

25 Claims, 9 Drawing Sheets

*300*

DETERMINE THAT A SURFACE IS SHARED BETWEEN A FIRST APPLICATION AND A SECOND APPLICATION
*305*

DETERMINE THAT A FAST CLEAR OPERATION HAS BEEN PERFORMED ON ONE OR MORE BUFFERS ASSOCIATED WITH THE SURFACE, THE FAST CLEAR OPERATION COMPRISING CLEARING ONE OR MORE LOCATIONS OF THE ONE OR MORE BUFFERS
*310*

WRITE PIXEL VALUE INFORMATION TO ONE OR MORE LOCATIONS OF THE ONE OR MORE BUFFERS
*315*

PERFORM A RESOLVE OPERATION ON THE SURFACE
*320*

300

DETERMINE THAT A SURFACE IS SHARED BETWEEN A FIRST APPLICATION AND A SECOND APPLICATION
305

DETERMINE THAT A FAST CLEAR OPERATION HAS BEEN PERFORMED ON ONE OR MORE BUFFERS ASSOCIATED WITH THE SURFACE, THE FAST CLEAR OPERATION COMPRISING CLEARING ONE OR MORE LOCATIONS OF THE ONE OR MORE BUFFERS
310

WRITE PIXEL VALUE INFORMATION TO ONE OR MORE LOCATIONS OF THE ONE OR MORE BUFFERS
315

PERFORM A RESOLVE OPERATION ON THE SURFACE
320

*FIG. 3*

TECHNIQUES FOR CLEARING A SHARED SURFACE

TECHNICAL FIELD

Embodiments described herein generally relate to processing shared surfaces, and, in particular, performing fast clear operations on shared surfaces.

BACKGROUND

With advances in microprocessor and other related technology, today's computers are equipped with processing capabilities that were once the exclusive domain of large mainframe computers. To exploit these capabilities, today's computers are often equipped with multi-tasking operating systems that allow multiple tasks of the same or different applications to be executed at the same time. These operating systems also enable concurrent displaying of multiple applications through windowing and other techniques within the constraint of the available shared surface of a display device. That is, the execution of these applications is rendered and shared on a shared surface.

BRIEF DESCRIPTION OF THE DRAWINGS

FIG. 3 illustrates an exemplary embodiment of a fourth logic flow diagram.

DETAILED DESCRIPTION

Figure 1A:
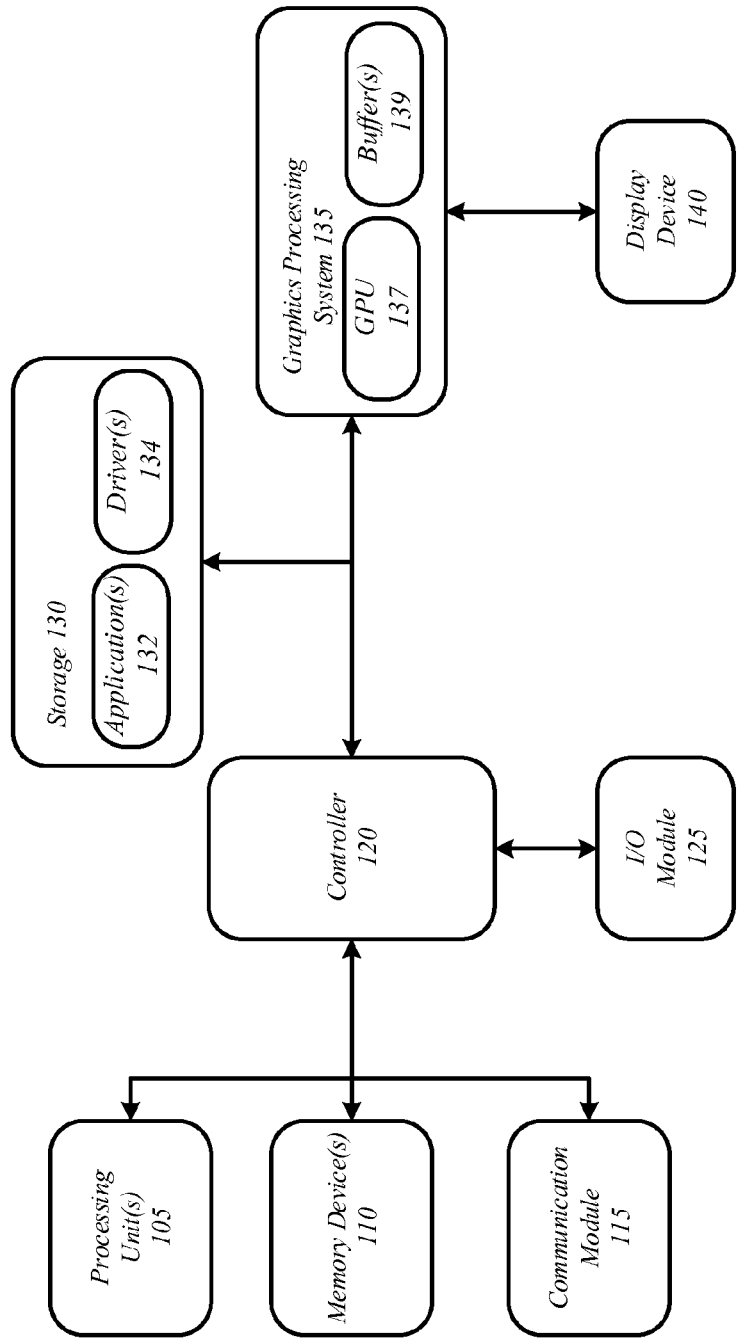
FIG. 1A illustrates an exemplary embodiment of a computing system.

Clearing a surface is a common operation in graphics applications that involves setting a region of memory, such as one or more buffers, to a particular value. The processing cost of a surface clear operation scales with the surface dimension. On higher resolution displays, clearing these large surfaces can cause the application to become pixel/memory bandwidth bound. Modern day graphic processing units (GPU's) try to optimize these clears to avoid such bottlenecks. One such optimization, referred to as deferred clears, clears a surface only if the surface actually gets used to generate the current frame. Another optimization, referred to as fast clears, clears a smaller compressed control surface instead of the original larger surface thereby reducing the memory bandwidth demands of the operation. When required, the original surface can be resolved using this compressed surface by a graphics driver to ensure the whole process is transparent to the application.

Typically, such optimizations work seamlessly only for surfaces that are not shared among multiple applications. Sharing surfaces across multiple applications is an increasingly common use case enabled by modern day operating systems that enables features such as efficient desktop composition. Existing solutions do not optimally perform clears of shared resources because doing so can introduce artificial CPU/GPU synchronization across multiple contexts. This is required to ensure the correctness of the surface contents. While current 3D graphics application programming interfaces (APIs) do not prohibit optimization in this area, they are not conducive to compression of these surfaces since they do not require applications to explicitly request resolution of the compression operation when the cleared surface is actually used. As a result, processes sharing a cleared shared surface across multiple contexts have no way to figure out if a resolve is needed before reading/writing to the shared surface. This prevents existing solutions from applying compression and other optimizations to these cleared shared surfaces.

Various embodiments are generally directed to an apparatus, system and method for performing fast clearing operations on shared surfaces shared between two or more applications. A fast clear operation may be performed by writing clear values, such as zero values, one values, null values and so forth into buffers for a compressed control surface smaller than the actual shared surface.

In some embodiments, an application may share a shared surface with a display compositor or a program to manage and control display windows, graphics, texts and so forth on the shared surface. In these instances, the access pattern for the desktop compositor is well-defined and the fast clear operation may be selectively performed on the shared buffers without concern of CPU/GPU synchronization issues.

A graphics driver can determine if one or more buffers is shared with a desktop compositor by looking at its description at create time and noting that it's a shared resource. The graphics driver may then enable the fast clear operation. When an application wants to write or draw to the shared surface it may first request that the shared surface is cleared. The fast clear operation may be performed and the application may then write or draw to the shared surface utilizing the compressed control surface. When the application is shared with the desktop compositor and requests that the shared surface to be presented, the shared surface may be resolved by moving, copying or mapping information in the compressed control surface to the actual shared surface. Ownership of the shared surface may then be transferred to the desktop compositor which may finalize the shared surface and display it on a display device.

In some embodiments, the shared surface may be shared between two or more applications which are not a desktop compositor. In these instances, a flag may be utilized to determine whether a fast clear operation has been performed on the shared surface and whether a resolve operation is needed on the shared surface. For example, a fast clear operation may be performed on the shared surface, a resolve flag may be set indicating that the fast clear operation has been performed and the application may then write or draw to the shared surface. The graphics driver may then determine if a resolve operation is needed by sending a read request to read the location where the resolve flag is stored and perform the resolve operation if the resolve flag is set. The resolve flag may be cleared when the resolve operation is performed. If the resolve flag is not set, the graphics driver will skip performing the resolve operation on the shared surface. This process may be repeated for each application writing or drawing to the shared surface. These and other details will become more apparent with the following description.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an embodiment of a computing system 100 to process data, information, communications, applications, and so forth. In various embodiments computing system 100 may have any number of component or modules.

Computing system 100 may include one or more processing units 105 that may be implemented using any processing circuitry, processor or logic device. A processing unit 105 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The one or more processing units 105 may be connected to and communicate with the other elements of the computing system 100 via one or more interconnects, such as one or more buses, control lines, and data lines.

In embodiments, computing system 100 may include one or more memory devices 110. The one or more memory devices 110 may be coupled with and communicate with processor unit 105. The Memory devices 110 may be coupled to the processing units 105 via one or more communications buses, or by a dedicated communications bus between processor unit 105 and memory device 110, as desired for a given implementation. In some embodiments, the one or more memory devices 110 may be shared with other components of the computing system 100, such as the graphics processing system 135. In some embodiments, the one or more memory device 110 may include memory cache hierarchies that reside in a processing unit 105 and the graphics processing system 135, or on a system level. These cache hierarchies may be part of a shared computer system resource. The one or more memory devices 110 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing system 100 may also include a communication module 115. The communication module 115 includes any device and circuitry for processing information or communications over wireless and wired connections. For example, the communication module 115 may include a receiver, a transmitter, one or more antennas, and one or more Ethernet processing components. The specific design and implementation of the communication module 115 may be dependent upon the communications network in which the computing system 100 is intended to operate. In some embodiments, the computing system 100 may be designed to operate in a plurality of communications networks and is not limited to a specific network.

In various embodiments, the communication module 115 may include one or more I/O controllers (not shown) to receive and output any signals and information. The I/O controller may enable communication over wireless and wired connections. In various embodiments, the I/O controller may be separate component or module of computing system 100. Moreover, the communication module 115 may enable the computing system 100 to communicate over one or more links.

The computing system 100 may include a controller 120 which may be a microcontroller or other type of processing circuitry, memory and interface logic. In some embodiments, the controller 120 may monitor and control operation of the computing system 100 including, but not limited, monitoring and controlling operation of the memory devices 110, the communication module 115 and the I/O module 125. The controller 120 may also monitor and control various aspects of the processing units 105, the graphics processing system 135 and the storage 130, including but not limited to, communication between various components of the computing system 100. In various embodiments, the controller 120 may be coupled with the various components and modules of the computing system 100 via one or more interconnects, such as a bus, trace and so forth.

As previously mentioned, the computing system 100 may include an Input/Output (I/O) module 125 providing one or more interfaces between the computing system 100 to any type of external system or device, such as a keyboard, mouse, printer, display device, and so forth. The I/O module 125 may communicate with the external system or device via any type of wired or wireless connection. In some embodiments, the I/O module 125 may communicate with other component and modules of the computing system 100 via controller 120. However, various embodiments are not limited in this manner and the I/O module 125 may have one or more direction connections with any of the components and modules.

In various embodiments, computing system 100 may include storage 130 which may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 130 may include technology to increase the storage performance enhanced protection for valuable digital media when multiple hard drives are included, for example. Further examples of storage 130 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Storage 130 may store any type of data and information in a persistent manner including, but not limited to one or more applications 132 and one or more drivers 134. The one or more applications 132 may include any type of application including an operating system, system software, enterprise software, gaming software, office suite software, accounting software, graphics software, media playing software, and so forth. The one or more applications 132 may provide system services to a user and maybe usable by the user to conduct various tasks, such as creating documents, playing multimedia files, communicating over one or more networks, and so forth.

The one or more drivers 134 may be a computer program that operates or controls a particular type of device that is attached to the computing system 100. The drivers 134 provide a software interface to hardware devices, enabling operating systems and other computer programs to access hardware functions without needing to know precise details of the hardware being used. The drivers 134 typically communicate with the device through the computer bus or communications subsystem to which the hardware connects. For example, when a calling program invokes a routine in one of drivers 134, the driver 134 issues commands to the device. Once the device sends data back to the driver 134, the driver 134 may invoke routines in the original calling program. The drivers 134 may be hardware-dependent and operating-system-specific. The drivers 134 usually provide the interrupt handling required for any necessary asynchronous time-dependent hardware interface.

In various embodiments, the computing system 100 may load the drivers 134 into system memory, such as memory devices 110 at start up time to provide an interface to the one or more devices. As will be discussed in more detail, one of the drivers 134 may be a graphics driver that may handle various elements for the graphics processing system 135. The graphics driver may provide an interface between various components or modules of the computing system 100 and the graphics processing system 135. In some embodiments, the graphics driver may at least partially be implemented in the graphics processing unit 137. However, various embodiments are not limited in this manner.

The computing system 100 may include a graphics processing system 135 coupled with a display device 140. The display device 140 may constitute any display device capable of displaying information. The display device 140 may include at least one of a Liquid Crystal Display (LCD), a Thin Film Transistor-LCD (TFT-LCD), an Organic Light Emitting Diode (OLED), a flexible display, a three-dimensional (3D) display, touchscreen and/or touch sensitive display and a projector, for example. The display device 140 may display a User interface (UI) or a Graphical User Interface (GUI) associated with controlling functionality of the computing system 100. In some embodiments, the computing system 100 may include two or more display units. The display device 140 may display any information or data associated computing system 100. For example, the display device 140 may display any interface or information associated with the one or more applications 132.

In various embodiments, the graphics processing system 135 may include a graphics processing unit (GPU) 137 and one or more buffers 139. The GPU 137 may include any processing unit, logic or circuitry optimized to perform graphics-related operations as well as the video decoder engines and the frame correlation engines. The GPU 137 may be used to render two-dimensional (2-D) and/or three-dimensional (3-D) images for various applications such as video games, graphics, computer-aided design (CAD), simulation and visualization tools, imaging, etc. Various embodiments are not limited in this manner; GPU 137 may process any type of displayable information and graphics data such as pictures, videos, programs, animation, 3-D, 2-D, objects images and so forth.

The GPU 137 may communicate data and information with the one or more buffers 139 to perform the graphics-related operations. The one or more buffers 139 may be any type of buffer such as a frame buffer to buffer information to present on the display device 140. In some embodiments, the one or more buffers 139 may also be one or more intermediate buffers, such as back buffers and render target buffers. A back buffer may be the main render target buffer and is a buffer where the GPU 137 may draw pixel value information for a shared surface for a scene that is being rendered off-screen. More specifically, the back buffer may be part of memory, such as memory device 110 or video memory that contains the next shared surface to be drawn. In some embodiments, a number of render target buffers may be created or destroyed as needed when processing shared surface for applications 132. Render target buffers may be used to store various shared surface information including pixel value information and the back buffer may then be used to store the final shared surface or display surface from the information in the other render target buffers. In some embodiments, the buffers may store pixel value information and clear values in buffers associated with a control surface and a shared surface.

In some embodiments, the display device 140 may display or present information in accordance with data stored in the one or more buffers 139 of the graphics processing system 135. The GPU 137 processes video or graphics commands from the processing unit 105 and applications 132 and provides the resulting data to the one or more buffers 139 for storage and retrieval by display device 140.

Figure 1B:
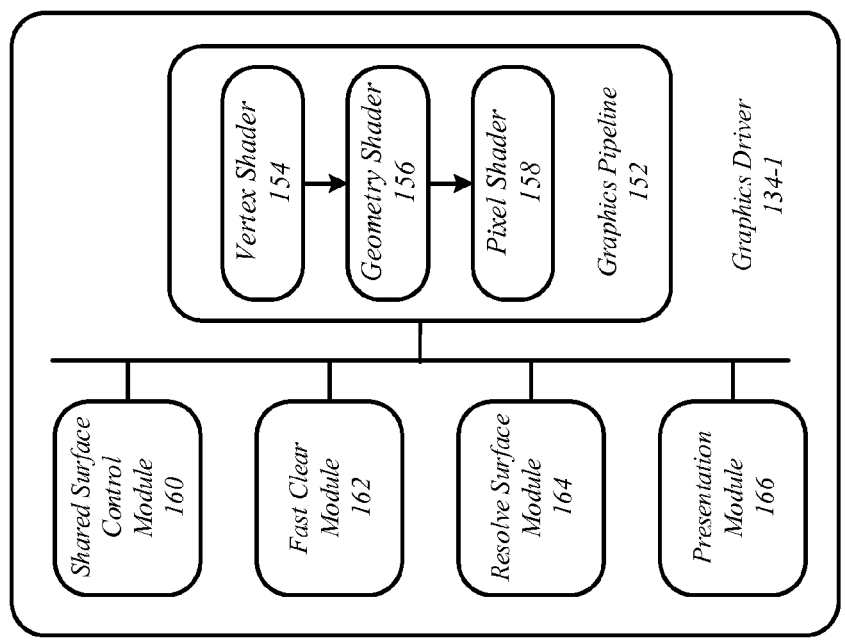
FIG. 1B illustrates an exemplary embodiment of a graphics driver.

FIG. 1B illustrates an exemplary embodiment of a system including a graphics driver 134-1 for processing shared surfaces. In some embodiments, a shared surface may be shared between two or more applications. For example, two or more applications may share different portions or sections of the shared surface and may each write pixel value information to the shared surface to present information on a display device via the presentation module 166. As will become apparent in the following description, the graphics driver 134-1 may enable and perform fast clear operations on the shared surface when it is shared between two or more applications. Further, the graphics driver 134-1 may include a graphics pipeline 152 to process graphics information including write and draw requests made by an application and generate the pixel value information to store in one or more buffers.

The applications that may share the shared surface may be the same as applications 132 discussed above with respect to FIG. 1A. More specifically, the applications may include an operating system, system software, enterprise software, gaming software, office suite software, accounting software, graphics software, media playing software, and so forth. Further, an application may provide system services to user and maybe usable by the user to conduct various tasks, such as creating documents, playing multimedia files, communicating over one or more networks, and so forth.

In some embodiments, one of the applications may be a desktop compositor such as Microsoft® Windows® Desktop Window Manager (DWM). A desktop compositor is a window manager that provides applications with off-screen buffers such as one or more render target buffers for a shared surface. The desktop compositor composites the buffers into an image representing the shared surface and writes the result into the display memory or frame buffer for presentation on a display device.

When one of the applications is a desktop compositor, the graphics driver 134-1 may enable the fast clear operation on the shared buffers for the application and the desktop compositor. A fast clear option may be performed by the graphics driver 134-1 entirely or in part by a graphics processing unit by utilizing a smaller control surface stored in memory to keep track of the pixel value information for the actual shared surface. The graphics driver 134-1 may write a clear value, such as a zero value or one value to one or more locations in the one or more buffers for the control surface to clear the shared surface. An application may then write pixel value information to the one or more buffers for the control surface for presentation either directly or via the graphics pipeline 152. The pixel value information may include color values for every pixel on the shared surface. Color values may be stored in 1-bit binary (monochrome), 4-bit palettized, 8-bit palettized, 16-bit highcolor and 24-bit truecolor formats. An additional alpha channel is sometimes used to retain information about pixel transparency.

Once the application writes the pixel value information to one or more buffers, the actual shared surface may then be updated with the pixel value information based on the pixel value information in the buffers for the control surface during a resolve operation. The shared surface may then be presented on the display device. In some embodiments, the shared surface may be a display surface that is displayed on a display device. A surface may include buffers, such as render target buffers, back buffers, etc. and other processing components relating to displaying the display surface on a display. If the shared surface is shared between two or more applications which are not a desktop compositor, a resolve flag may be utilized to ensure the shared surface is fast cleared and is resolved. These and other details will become more apparent with the following description.

In some embodiments, the graphics driver 134-1 may include a shared surface control module 160 which may control various aspects of the shared surface including determining when the shared surface is shared between applications, determining when a fast clear operation and a resolve operation have been performed on the shared surface and controlling the transfer of ownership of the shared surface (including the shared buffers) between the applications.

The shared surface control module 160 may determine when a surface is shared between applications based on the definition of the resource at creation time. For example, when the shared surface is shared between an application and a desktop compositor, the shared surface control module 160 may make this determination when the application presents one or more buffers, such as render target buffers to the desktop compositor for display. Such a present operation also demarcates the transfer of ownership of the shared surface from application to desktop compositor. In this example, the shared surface control module 160 may enable a fast clear operation on the shared buffers once ownership is established upon discerning the present event from the application to the desktop compositor.

The shared surface control module 160 may also determine when a fast clear operation has been performed by an application and whether a resolve operation is required before the shared surface is presented on the display device. In some embodiments, the shared surface control module 160 may determine when a fast clear operation has been performed by an application by looking for clear values in one or more of the buffers when the shared surface is shared between an application and a desktop compositor. In some instances, the shared surface control module 160 may assume that a fast clear operation was performed on the shared surface and automatically perform a resolve operation when the shared surface is shared between an application and a desktop compositor.

In some embodiments, the shared surface control module 160 may determine that a fast clear operation has been performed on the shared surface by inspecting or reading a resolve flag stored in graphics memory and one or more buffers such as the render target buffers and back buffer. More specifically, when a shared surface is created and shared between two or more applications that are not a desktop compositor, one or more bytes of graphics memory may be allocated to store a resolve flag. The shared surface control module 160 may set the resolve flag when a fast clear operation is performed, determine that the fast clear operation has been performed by reading the memory location, and clear the resolve flag when a resolve operation has been performed.

The shared surface control module 160 may set and clear the resolve flag in a number of different ways. In one example, the resolve flag may be allocated in a render target buffer of the graphics memory as a 1×1 pixel and may be set by writing any non-zero color value to the location for the resolve flag in the render target buffer. The shared surface control module 160 may clear the resolve flag by writing a zero color value or one when a resolve operation has been performed on the shared surface.

In another example, the resolve flag may be allocated in a render target buffer of the graphics memory as a 1×1 pixel again, but may be set by the shared surface control module 160 sending information to a pixel shader 158 to draw a quad or an object having four vertices with a non-zero color value. The resolve flag may be cleared by the shared surface control module 160 by sending information to the pixel shader 158 to draw another quad with a zero color value.

In a third example, the resolve flag may be allocated as an unordered access view resource (e.g., a texture resources) in the graphics memory and the shared surface control module 160 may send information to a compute shader (not shown) to set a non-zero color value to the unordered access view resource. Similarly, the resolve flag may be cleared by the shared surface control module 160 by sending information to the compute shader to set the zero color value to the unordered access view resource. Various embodiments are not limited to the above recited examples and other methods way be used to set and clear a resolve flag in one or more memory locations by the graphics driver 134-1 and the graphics processing unit 137.

The shared surface control module 160 may also determine whether a resolve operation is required by reading the resolve flag in the graphics memory. For example, the shared surface control module 160 can send information to a vertex shader 154 to read the resolve flag and to output a degenerate quad or polygon when the resolve flag indicates that the shared surface was not fast cleared. More specifically, in some instances a shared surface may be resolved by issuing in draw command to draw a quad the size of the shared surface by the resolve surface module 164. Prior to the completing the draw command, the vertex shader 154 may read or sample the buffer in the display memory having the resolve flag and output a degenerate quad that is clipped when the resolve flag indicates that the shared surface was not fast cleared. However, when the resolve flag indicates that the shared surface has been fast cleared it may be resolved by outputting a valid quad that covers the entire shared surface.

In another example, the shared surface control module 160 may predicate the resolve based on the actual value of resolve flag. For this purpose, prior to the resolve operation, the shared surface control module 160 can issue a "predicate draw" that reads or samples the display memory storing the resolve flag and instructs the resolve surface module 164 to discard all the output pixels if the resolve flag indicates the surface was not fast cleared. Next the shared surface control module 160 may send information to the resolve surface module 164 to issue the draw quad instruction to perform the usual resolve operation except this is now predicated based on the results from previous "predicate draw." If the predicate draw actually outputted non-zero pixels then the surface is resolved.

In a third example, the shared surface control module 160 may send information to the vertex shader 154 or the pixel shader 158 to issue a draw command with parameters that may be read from the buffer storing the resolve flag. When the resolve flag is not set or indicates that a fast clear operation has not been performed, the draw command may generate a degenerate quad or geometry. However, when the resolve flag is set the resolve operation may be conducted on the shared surface.

In all cases, when the resolve flag is set indicating that a fast clear operation has been performed, a resolve operation must be performed prior to another application fast clearing and drawing on the control surface. When the resolve flag is not set indicating that a fast clear operation has not occurred, a resolve operation is not required and will not be performed.

In some embodiments, the graphics driver 134-1 may include a fast clear module 162 to perform a fast clear operation on a shared surface utilizing a compressed control surface that is also allocated in graphics memory. A fast clear operation may be performed by the graphics driver 134-1 and in particular the fast clear module 162 entirely or in part by a graphics processing unit by utilizing a smaller control surface stored in memory to keep track of the pixel locations in the original surface that have the clear value. In various embodiments, the fast clear module 162 may receive information or data from an application that it wishes to perform a fast clear operation prior to it writing or drawing to the shared surface utilizing the control surface. The fast clear module 162 may receive the information and perform the fast clear operation by clearing the smaller control surface instead of the original surface. As an example the graphics driver 134-1 may issue a quad that covers the entire control surface and instruct a pixel shader to perform an operation on the quad that essentially clears the surface by writing zero or clear color value.

When the shared surface is shared between two or more applications, the fast clear module 162 may perform a fast clear operation for each of the applications, but first must ensure that resolve operation has been performed prior to performing a fast operation after the first application draws to the control surface. More specifically, the fast clear module 162 must first ensure that the pixel value information for the actual shared surface has been set based on the control surface and then may perform the fast clear operation.

In some embodiments, when an application shares the shared surface with a desktop compositor the fast clear module 162 may perform the fast clear operation by clearing the associated control surface for one or more buffers shared between the application and the desktop compositor. As previously discussed, the shared buffers may be one or more render target or back buffers that may be written to by the fast clear module 162.

Once the shared surface has been cleared, the application may write to the control surface by utilizing the graphics pipeline 152. More specifically, the application may issue one or more draw or write commands to draw polygons on the shared surface. The polygons may include triangles or quads having one or more vertices. The polygons may be drawn on the shared surface by writing pixel value information to one or more buffers for the control surface. More specifically, pixel value information may be written to a number of render target buffers and then finally to a back buffer to generate the shared surface.

The graphics driver 134-1 may also include a resolve surface module 164 to perform a resolve operation on a shared surface. The resolve operation moves, copies or maps the pixel value information from the control surface to the actual shared surface by drawing a quad that covers the entire actual surface. The pixel shader for this quad fetches the corresponding bits from the control surface and writes the clear value to the actual surface location if the control surface noted the location should have clear value. In some embodiments when the shared surface is shared between an application and a desktop compositor, the resolve operation may be performed by the resolve surface module 164 when the application issues a present command or instruction to the graphics driver 134-1. Prior to transferring ownership of the shared surface and shared buffers from the application to the desktop compositor, pixel value information may be copied, moved or mapped from the control surface to the actual shared surface ensuring that the shared surface has the correct pixel value information for presentation. Ownership of the shared surface and shared buffers may then be transferred to the desktop compositor. The desktop compositor may present the shared surface on a display device utilizing the presentation module 166.

In some embodiments, when the shared surface is shared between two or more applications which are not a desktop compositor the resolve surface module 164 may resolve the shared surface prior to transferring ownership from one application to another application. The resolve operation may be predicated or based on a fast clear operation being performed prior to the transfer. As previously discussed, a resolve flag may be set in graphics memory when a fast clear operation has been performed by an application. The surface control module 160 may determine that a fast clear operation has occurred by reading or sampling the resolve flag in the graphics memory. When resolve flag is set the surface control module 160 may send information to the resolve surface module 164 to resolve the surface after the application draws or writes to one or more buffers of the control surface. The surface control module 160 may then transfer ownership of the shared surface and buffers to the next application. This process may be repeated until every application draws or writes pixel value information to be presented in a shared surface on a display device. When the resolve flag is sampled or read in the display memory and a fast clear operation has not been performed, the resolve operation may be skipped saving processing cycles.

The graphics driver 134-1 may also include a graphics pipeline 152 having one or more shaders, modules, and components for processing information for the shared surface. In some embodiments, the shaders, modules and components may be separate or only partially implemented as part of the graphics driver 134-1. Further, FIG. 1B only illustrates the graphics pipeline 152 having a limited number of shaders including a vertex shader 154, a geometry shader 156 and a pixel shader 158. However, various embodiments are not limited in this manner and the graphics pipeline 152 may include other shaders and processing components such as tessellation shaders and compute shaders.

The vertex shader 154 may receive graphics information in a graphics processing stream for processing an object or polygon of a shared surface and may be in response to the application requesting processing or issuing a draw command. In some embodiments, the vertex shader 154 may retrieve the graphics information from the one or more buffers in response to a request by the application. More specifically, the application may issue a draw command to the graphics pipeline 152 and the graphics information may include one or more of point data, line data, plane data, circle data, triangle data, spline curve data, hue data, and color data. The graphics information may also include polygon data or triangle data including one or more vertices or points in a three-dimensional (3D) space for processing by the graphics pipeline 152. The one or more vertices may be combined or connected to create one or more polygons, such as a triangle or quad to create the object. The graphics information may also include information describing the object, such as the color, hue, and texture.

In some embodiments, the vertex shader 154 may process the graphics information and output the processed graphics information as vertex information. The vertex information may include vertex control points, mesh information and other information relating to vertices to create a polygon, triangle, quad and so forth. The vertex shader 154 may be used to manipulate objects in a 3D environment or space by performing mathematical operations on the objects' graphics information to generate the vertex information. For example, the vertex shader 154 may apply a shading effect such as matrix palette skinning, which allows programmers to create realistic effects using a skeletal animation. Once these effects are applied or executed on the graphics information, the vertex shader 154 may output graphics information including vertex information. Further, various embodiments are not limited to the above-recited examples, and the vertex shader 154 may manipulate objects in any manner.

In some embodiments, the vertex shader 154 may be utilized to read a resolve flag and to output a degenerate quad or polygon when the resolve flag indicates that the shared surface was not fast cleared. In some embodiments, the vertex shader 154 may read the resolve flag by drawing a 1×1 quad or polygon as a texture and only returns an output when the resolve flag is set indicating that a fast clear operation has been performed. In a third example, the vertex shader 154 may receive a draw command with parameters that may be read from the buffer storing the resolve flag. When the resolve flag is not set or indicates that a fast clear operation has not been performed, the draw command may generate a degenerate quad or geometry. Various embodiments are not limited in this manner.

The graphics pipeline 152 may include a geometry shader 156 to generate new graphics primitives, such as points, lines, and triangles for subject, polygons and quads as graphics information. For example, a series of line strips representing control points for a curve are passed to the geometry shader 156 and depending on the complexity required the geometry shader 156 can automatically generate extra lines, each of which provides a better approximation of a curve. The geometry shader 156 may output geometry information including multiple vertices forming a single selected topology, such as tristrip, linestrip, and pointlist. Generally, the graphics information including the vertex information and the geometry information may be sent to a rasterization stage such as the pixel shader 158 or may be sent to one or more buffers via a stream output stage or command to be fed back into the graphics pipeline 152 or for displaying.

As previously discussed, the pixel shader 158 may be utilized to read or sample the resolve flag. In addition, the pixel shader 158 computes color and other attributes for the graphics information. The pixel shader 158 may receive graphics information including the processed vertex information, tessellation information and geometry information from the geometry shader 156. The pixel shader 158 may then perform pixel shading operations on the graphics information on a per pixel basis. For example, the pixel shader 158 may render, light, shade or color each pixel of an object or a frame for output to a display. Once the pixel shader 158 completes processing the graphics information, the object may be displayed. More specifically, the pixel shader 158 may write pixel value information to one or more buffers such as a frame buffer that may be display on a display device.

Figure 1C:
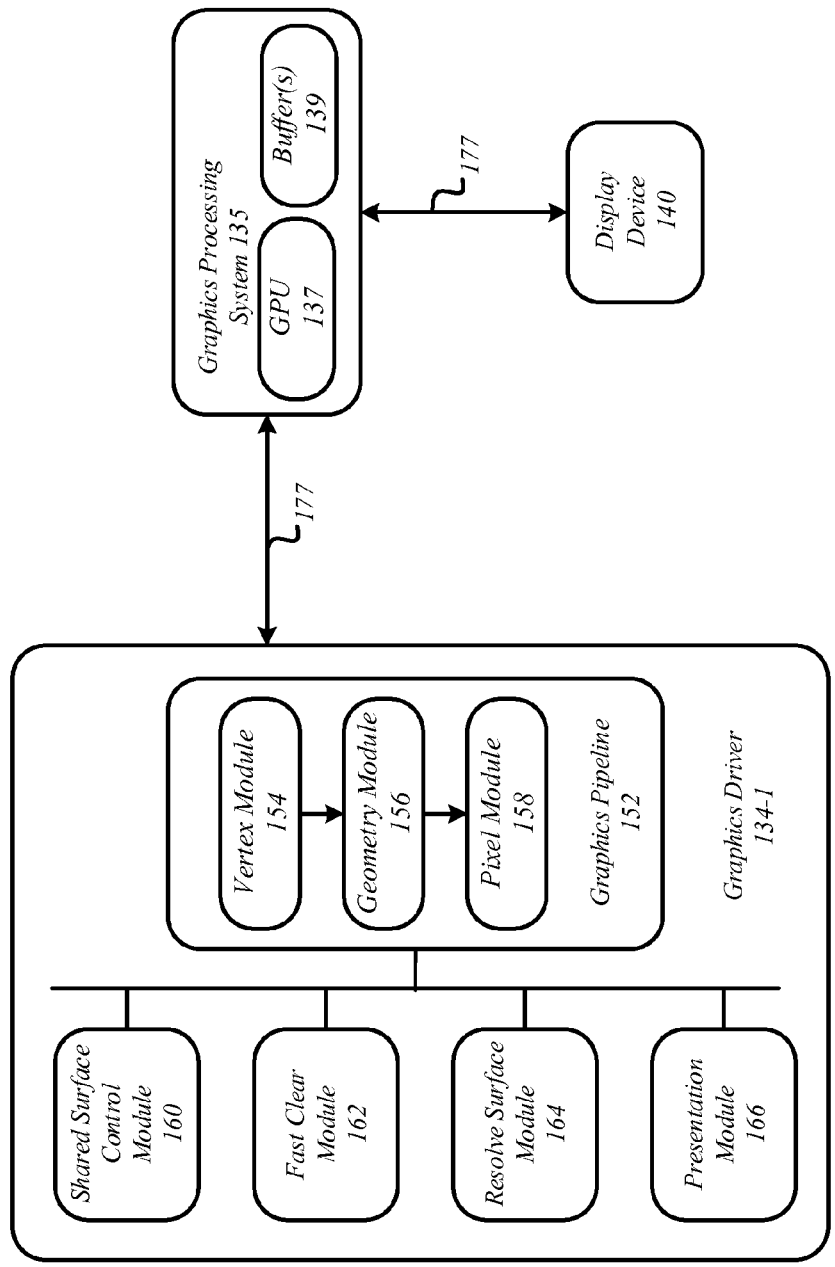
FIG. 1C illustrates an exemplary embodiment of a computing system.

FIG. 1C illustrates an exemplary embodiment of a computing system 175 for processing information including graphics information. The modules and components illustrates in FIG. 1C may the same as or similar to the liked named modules and components of FIGS. 1A and 1B.

In various embodiments, the computing system 175 may be used to process graphics information including processing information to present on a shared surface. The graphics driver 134-1 and its modules may communicate information via one or more interconnects 177 with the graphics processing system 135. The graphics driver 134-1 may communicate information that is processed by the GPU 137 and/or stored in the one or more buffers 139. For example, the graphics driver 134-1 may utilize the GPU 137 to process the shared surface and store information in the buffers 139 such as pixel value information for the shared surface. The GPU 137 may process the information and the buffers 139 may store pixel value information in one or more render target buffers and back buffers during the processing of the shared surface. In some embodiments, the buffers 139 may include space allocated to store a resolve flag to indicate whether or not a fast clear operation has occurred.

In addition, display information including pixel value information may be communicated via one or more interconnects 177 between the graphics processing system 137 and the display device 140 for presentation. For example, the GPU 137 may process a shared surface utilizing the one or more buffers 139 including a frame buffer. The GPU 137 may store final pixel value information in the frame buffer which may then be communicated and displayed on the display device 140. Various embodiments are not limited in this manner and other information may be communicated between the modules and components of computing system 175.

Figure 2A:
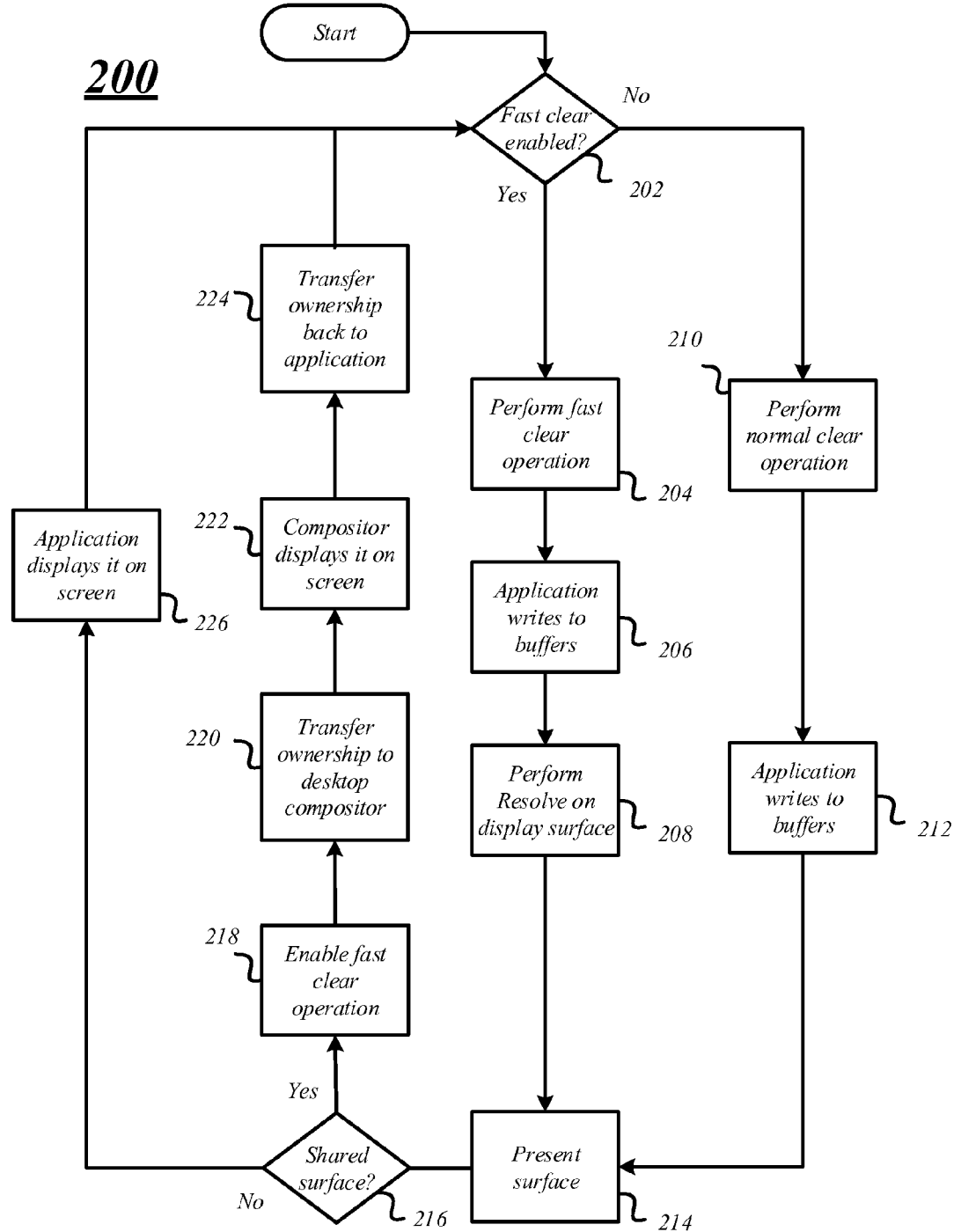
FIG. 2A illustrates an exemplary embodiment of a first logic flow diagram.

FIG. 2A illustrates an exemplary embodiment of a first logic flow 200 for processing a shared surface shared between an application and a display compositor. Typically, a desktop compositor has a well-defined access pattern for the render target and back buffers. Thus, in these situations a resolve flag is not required and the graphics driver may determine when render target and back buffers are shared with the desktop compositor by inspecting a description of the buffers when they are generated and noting that they are a shared resource. A fast clear operation may be enabled for the application sharing the shared surface with the desktop compositor when the buffers are a shared resource.

In various embodiments, the logic flow 200 may include determining whether fast clear is enabled at decision block 202. If this is the first time a shared surface is to be presented that is shared between an application and a desktop compositor, fast clear may not be initially enabled. When fast clear is not enabled a graphics driver may perform a normal clear operation at block 210. The application may then write to the one or more buffers, such as render target and back buffers at block 212 and the surface may be presented or sent to the desktop compositor at block 214. In some cases, the surface may not be shared with a desktop compositor and the logic flow may continue to block 216, as will be discussed in more detail below.

When the buffers are shared, the display driver may perform a fast clear operation at block 204. The fast clear operation may be performed on the shared surface by utilizing at control surface and writing clear values, such as a one or zero value in one or more buffers. The surface may be cleared and at block 206 the application may write or issue one or more draw commands to draw objects including polygons or quads by writing pixel value information into the one or more buffers for the control surface. The pixel value information may be written and processed by a graphics pipeline as previously discussed. Once the application writes to the one or more buffers, a resolve operation may be performed at block 208. More specifically, the pixel value information in the control surface may be moved, copied or mapped to the shared surface or into one or more locations of a buffer associated with the actual shared surface. In some embodiments, the resolve operation may be performed on the shared surface when the application is presented or issues a present command to a graphics driver.

At block 214, the application may present the surface to the desktop compositor and a determination as to whether the surface is a shared surface or not is made at block 216. For example, the fast clear operation may not be enabled because the surface is not shared with a desktop compositor. In this case, the application may send or issue a display command such that the surface is displayed on a display surface.

If at block 216 the surface is shared with a desktop compositor, the fast clear operation may be enabled if it is already not enabled at block 218. Ownership of the surface and buffers may be transferred to a desktop compositor at block 220. The desktop compositor may then take control of the shared surface and prepare it for presentation on a display device. More specifically, the desktop compositor composites the buffers into an image representing the shared surface and writes the result into the display memory or frame buffer for presentation on a display device. The shared surface may then be displayed on a display device at block 222. The information in the frame buffer may be communicated to a display device and displayed to a user of a computing system. The ownership of the surface may be transferred back to the application at block 224 for preparing the next frame to be displayed.

The logic flow 200 may be repeated any number of times as the shared surface is updated or changes are required on the shared surface. For example, if the application is a gaming application, the shared surface may need to be frequently updated as the game is being played. In another example, the application may be a word processing application and the shared surface may be updated or recalculated as user types or inputs information into the word processing application. Various embodiments are not limited to these examples.

Figure 2B:
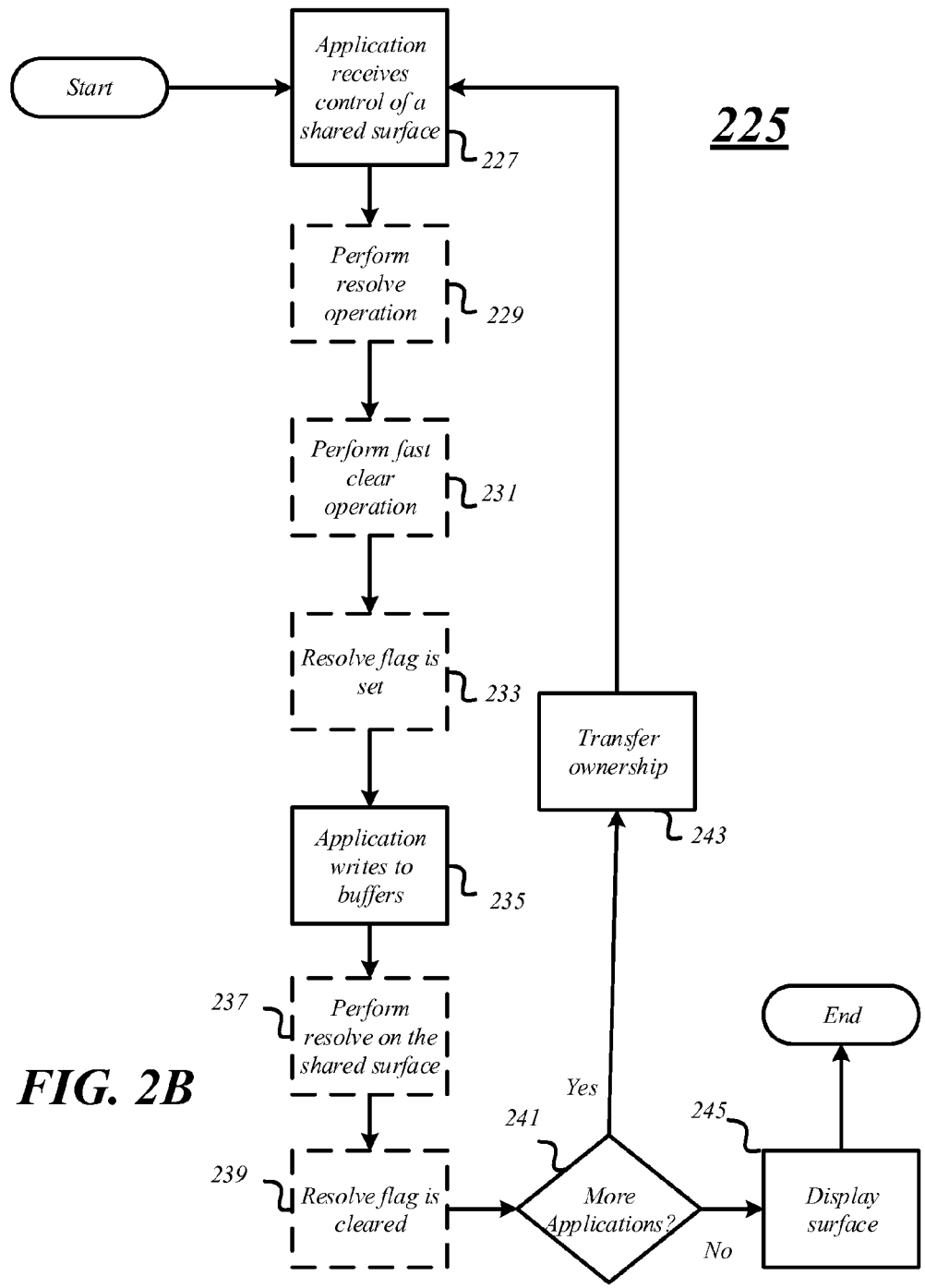
FIG. 2B illustrates an exemplary embodiment of a second logic flow diagram.

FIG. 2B illustrates an exemplary embodiment of a second logic flow 225 for processing a shared surface shared between two or more applications. At block 227 an application may receive control or ownership of the shared surface to draw one or more polygons, quads, triangles, etc. on the shared surface. At block 229, a predicated resolve operation may be performed on the shared surface. More specifically, a display driver may read a memory location for a resolve flag and determine if the flag is set or not set. If the resolve flag is set, pixel value information in buffers associated with a controlled surface may be resolved by copying, moving, or mapping the information to the normal surface.

At block 231, a fast clear operation may be optionally performed on the shared surface by utilizing a control surface. More specifically, the application may initiate a fast clear operation and a clear value may be written to buffer locations associated with the control surface. In some embodiments, the clear value may be a one or zero value. However, various embodiments are not limited in this manner and the clear value may be any value indicating the control surface is cleared, such as a null value.

In some embodiments, only areas of the shared surface allocated to the application may be fast cleared for the application. More specifically, when the shared surface is shared between applications, one application may only be using a portion of the shared surface. When doing the fast clear operation, the application may only write clear values to the buffers locations associated with the portion of the shared surface in which the application is using. For example, an application may only be using an upper left portion of the shared surface, and as such, may only write clear values for that portion of the shared surface to the buffers.

At block 233 a resolve flag may be set when the fast clear operation is performed at block 231. The resolve flag may be stored in any location in the graphics memory associated with the shared surface. For example, the first 4 bytes of a buffer, such as the frame buffer, render target buffer, back buffer, and so forth associated with the shared surface may be allocated to store the resolve flag. The location may be allocated in a buffer such that a graphics driver may access the buffer without effecting computing processing cycles or normal memory read and write requests. Various embodiments are not limited to a 4 byte size for storing the resolve flag, any size location may be used to store the resolve flag as needed.

At block 235, an application may write pixel value information to one or more buffers such as render target buffers or back buffers to draw polygons, quads, triangles, and so forth on the shared surface. The pixel value information may be written to a control surface and in doing so may be overwriting the clear values that were previously written into the buffer locations during the fast clear operation. As similarly discussed above, an application may only be using a portion of the shared surface, and as such the application may only write pixel value information to buffer locations associated with that portion of the shared surface via the control surface.

At block 237, the resolve flag may be checked to determine if the fast clear operation was performed on the shared surface, and if so, a resolve surface may be performed on the surface. A graphics driver may receive a read request from the application for the driver and/or GPU to sample the buffer location for the resolve flag to determine if it is set or not set. During the resolve operation, pixel value information may be moved, copied or mapped from buffers associated with the control surface to buffers associated with the actual shared surface. In some embodiments, the resolve operation may be a predicated resolve operation based on whether the resolve flag is set or not set as determined above in block 237. As previously discussed, a number of methods may be used to determine the value for the resolve flag and if a fast clear operation has been performed. If so, the resolve operation may occur and the resolve flag may be cleared at block 239. However, if a fast clear operation has not been performed and the resolve flag is not set then the resolve operation will not occur and the logic flow may continue at block 241.

At decision block 241, a determination may be made as to whether additional applications sharing the shared surface need to be processed. If additional applications requiring processing, ownership of the shared surface and buffers may be transferred to the next application for processing at block 243. Blocks 227-243 may be repeated until all of the applications utilizing the shared surface are processed and write pixel value information to be presented in the shared surface on a display device. If no additional applications need to be processed at block 241, the shared surface may be finalized and sent to the frame buffer to be displayed on the display device. The display device may retrieve or receive the information from the frame buffer and present the shared surface at block 245. Logic flow 225 may be repeated any number of times for any number of shared surface. The shared surface may be updated frequently based on 60 Hz or 120 Hz refresh rates. Various embodiments are not limited in this manner discussed above.

Figure 2C:
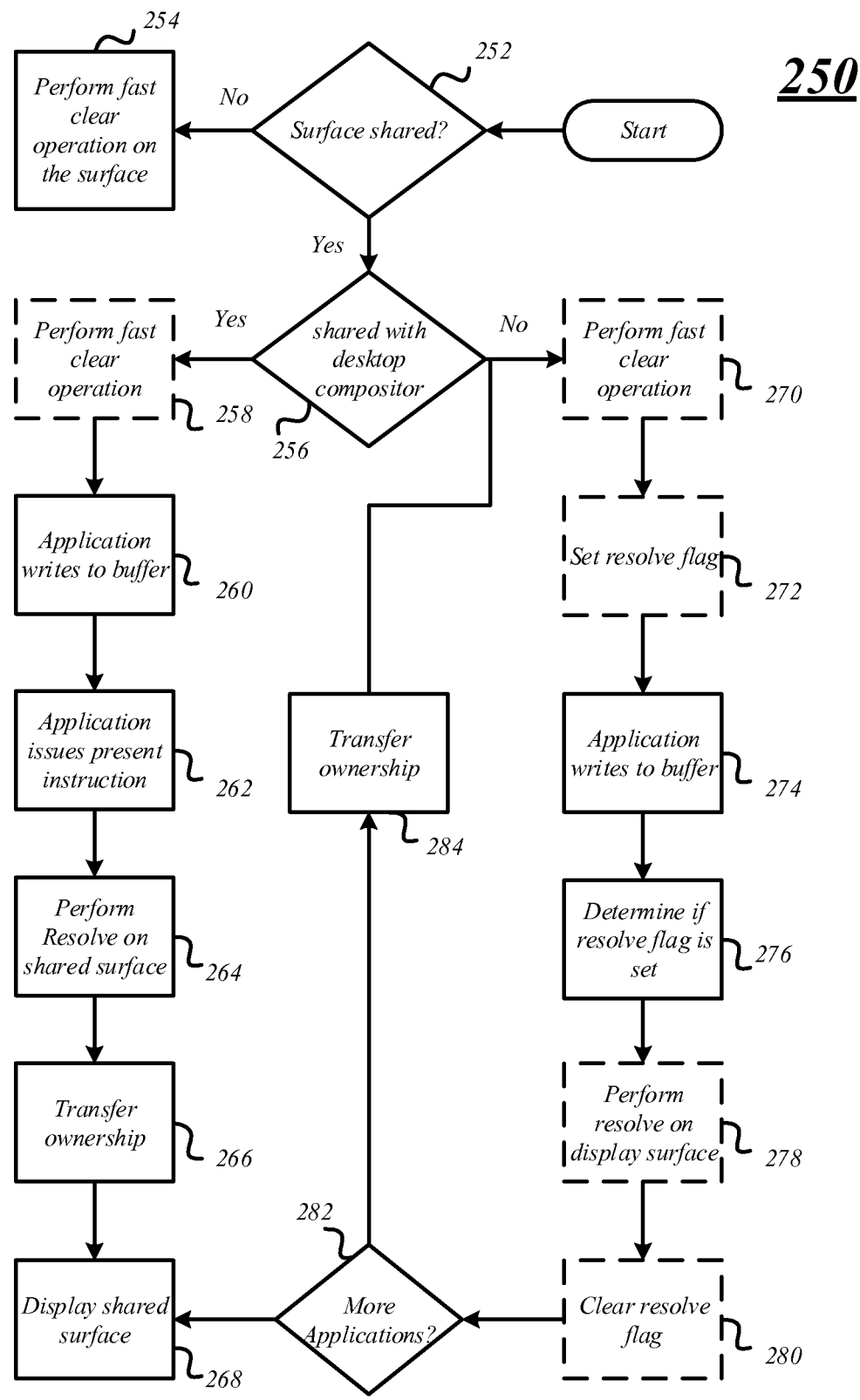
FIG. 2C illustrates an exemplary embodiment of a third logic flow diagram.

FIG. 2C illustrates an exemplary embodiment of a third logic flow 250 to control and process shared surfaces in a computing environment. The various blocks of FIG. 2C may be performed by any of the components and modules of computing systems discussed above with respect to FIGS. 1A-1C including the graphics driver 134-1 and the graphics processing system 135.

At block 252, a determination may be made as to whether a shared surface is shared between two or more applications. For example, one or more buffers may be analyzed to determine if ownership of the buffers is shared between applications. In another example, write or draw instructions from multiple applications to the same shared surface may also be used to determine that the desktop surface is shared. Various embodiments are not limited to these examples and any other technique may be used to determine if a shared surface is shared between applications.

When the shared surface is not shared between two or more applications, fast clear operations may be conducted without any concern of introducing artificial computing processing and graphics processing synchronization issues with multiple contexts at block 254. However, if the shared surface is shared at block 252 various techniques to ensure synchronization issues do not occur must be employed. At block 256 a determination may be made as to whether an application shares the shared surface with a desktop compositor or if two or more applications share shared surface. An application sharing the shared surface with a desktop compositor is a special case and may be handled differently than when the shared surface is shared between applications that are not a desktop compositor.

The logic flow 275 may continue and a fast clear operation may be performed on the shared surface at block 258 when the shared surface is shared with an application and a desktop compositor at block 256. Similarly, a fast clear operation may be performed on the shared surface at block 270 when the shared surface is shared between two or more applications that are not a desktop compositor. However, as will become apparent with the description of blocks 272-284, this fast clear operation may be handled differently. The fast clear operation performed at both blocks 258 and 270 may the same as the fast clear operation previously discussed by utilizing a control surface.

Continuing with the logic flow 275 when an application is sharing the shared surface with a desktop compositor, the application may write or issue draw commands to draw one or more polygons, quads, triangles and so forth to the shared surface at block 260. In some embodiments, pixel value information may be written to buffers associated with the control surface to generate or draw the one or more polygons, quads, triangles and so forth.

At block 262, the application may issue a present instruction or command to a graphics driver and/or graphics processing unit to present the shared surface on a display device. A graphics driver may receive the present instruction and at block 264 may perform a resolve operation on the shared surface. More specifically, the pixel value information stored in one or more buffers associated with the control surface may be moved, copied or mapped to the actual shared surface.

In various embodiments, ownership of the shared surface (and buffers) may be transferred from the application to the desktop compositor at block 266. The desktop compositor may finalize the shared surface. For example, the desktop compositor may process pixel value information in one or more render target buffers to generate a final shared surface that may be stored in a frame buffer. Further, the pixel value information may be sent to a display device for displaying at block 268. In some embodiments, a display device may retrieve the pixel value information from a frame buffer.

If at decision block 256 the shared surface is shared between two more applications which are not a desktop compositor, a fast clear operation may be performed on the shared surface at block 270 as previously discussed. However, a resolve flag may be used to keep track of whether a fast clear operation has been performed on the shared surface or not. Space may be allocated for the resolve flag in a graphics memory and the resolve flag may be set at block 272. In other words, when the resolve flag is set a fast clear operation has been performed on the shared surface indicating that a resolve operation must be performed before another application clears and writes information to the shared surface.

The application may write or issue draw commands to draw one or more polygons, quads, triangles and so forth to the shared surface at block 274. In some embodiments, the application may utilize a control surface when writing pixel value information to the shared surface. Further, the graphics driver may check whether the resolve flag is set at block 276. More specifically, the graphics driver may send a read request to a graphics processing unit (GPU) to read the graphics memory location allocated for the resolve flag. If the resolve flag is set at block 276, a resolve operation may be performed on the shared surface at block 278. However, if the resolve flag is not set at block 276, the resolve operation may be skipped. Finally, the resolve flag may be cleared at block 280 when the resolve operation is performed or this task may be skipped if the resolve flag does not need to be cleared.

In some embodiments, a determination as whether additional applications need to be processed may be made at block 282. When additional applications need to be processed that share the shared surface, ownership of the shared surface and buffers may be transferred to the next application at block 284. Once ownership is transferred, blocks 270-242 may be repeated until all of the applications sharing the shared surface are processed and write to the shared surface. If no other applications need to be processed and write to the shared surface at blocks 282, the shared surface may be displayed on a display device at block 268.

Logic flow 275 may be repeated any number of times for each shared surface to be presented on a display device. In addition, logic flow 275 illustrates a number of blocks occurring in a specific order; however various embodiments are not limited in this manner. One or more of the processes discussed in logic 275 may occur simultaneously or before other processes occur.

FIG. 3 illustrates an embodiment of a fourth logic flow 300 for processing a shared surface. The logic flow 300 may be representative of some or all of the operations executed by one or more embodiments described herein. For example, the logic flow 300 may illustrate operations performed by the systems 100, 150 and 175.

In the illustrated embodiment shown in FIG. 3, the logic flow 300 may include determining that a shared surface is shared between a first application and a second application at block 305. A computing system may determine whether the display shared is or not shared in a number of different ways. For example, a computing system may look at the ownership of one or more buffers and determine whether the buffers are shared between applications. In another example, a computing system may determine that the shared surface is shared when more than one application requests to write to the shared surface. Various embodiments are not limited to these examples and other techniques may be used to determine that a shared surface is shared between two or more applications.

At block 310, the logic flow 300 may also include determining that a fast clear operation has been performed on the shared surface, the fast clear operation comprising clearing one or more locations of one or more buffers associated with the shared surface. In various embodiments, a computing system may determine when a fast clear operation has been performed on one or more buffers by inspecting the one or more buffers and determining whether clear values have been written into locations of the buffers. A computing system may also determine whether a fast clear operation has been performed by inspecting a resolve flag and determining whether it is set or not set. More specifically, when the shared surface is shared between applications, none of which are a desktop compositor, a resolve flag may be set when a fast clear operation is performed and cleared when a resolve operation is performed. In some embodiments, when the shared surface is shared between an application and a desktop compositor a computing system may assume that a fast clear operation has been performed when the application requests the display to be presented. Various embodiments are not limited to these examples.

In various embodiments, the logic flow 300 may include writing pixel value information to one or more locations of the one or more buffers at block 315. More specifically, an application may issue one or more draw or write commands that may be processed and pixel value information may be written into one or more buffers such that the shared surface may be presented in accordance with the draw commands. In some embodiments, the draw or write commands may be processed by a graphics pipeline and pixel value information may be generated and outputted by a pixel shader.

In one example, an application may issue a draw command to draw a quad on a display, which may be processed by the graphics pipeline and pixel value information may be generate. The quad may include four vertices and the pixel value information may include color values for every pixel on the shared surface. The color values may be generated such that quad is illustrated on the shared surface when it is presented on a display device. Various embodiments are not limited to this example.

At block 320, the logic flow 300 may include performing a resolve operation on the shared surface. The resolve operation may move, copy or map pixel value information written to buffers for a control surface to one or more buffers for the actual shared surface. As previously discussed, a control surface may be used to perform the fast clear operation to quickly clear the shared surface and to store pixel value information generated by an application's draw or write request. In some embodiments, the resolve operation may be a predicated resolve operation and may only be performed based on whether a fast clear operation has been performed and a resolve flag is set.

Figure 4:
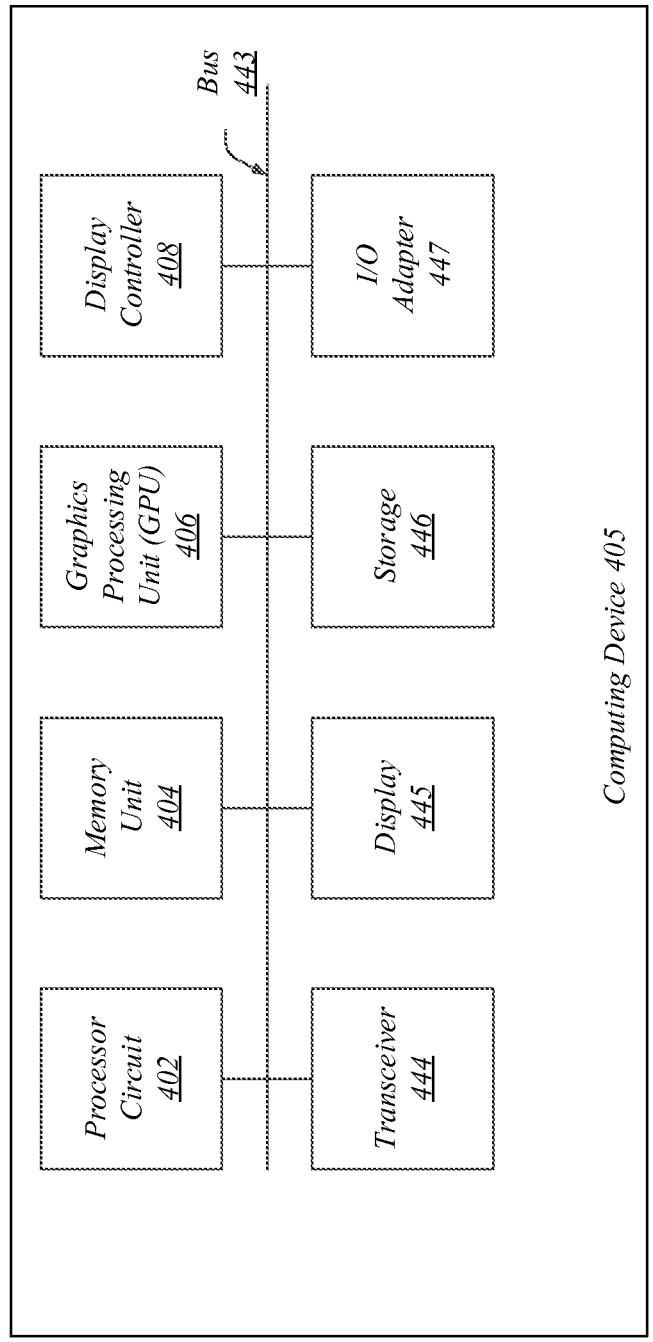
FIG. 4 illustrates an exemplary embodiment of a computing system.

FIG. 4 illustrates one embodiment of a system 400. In various embodiments, system 400 may be representative of a system or architecture suitable for use with one or more embodiments described herein, such as computing systems 100, 150, 175, and logic flows 200, 225, 250 and 300. The embodiments are not limited in this respect.

As shown in FIG. 4, system 400 may include multiple elements. One or more elements may be implemented using one or more circuits, components, registers, processors, software subroutines, modules, or any combination thereof, as desired for a given set of design or performance constraints. Although FIG. 4 shows a limited number of elements in a certain topology by way of example, it can be appreciated that more or less elements in any suitable topology may be used in system 400 as desired for a given implementation. The embodiments are not limited in this context.

In various embodiments, system 400 may include a computing device 405 which may be any type of computer or processing device including a personal computer, desktop computer, tablet computer, netbook computer, notebook computer, laptop computer, server, server farm, blade server, or any other type of server, and so forth.

In various embodiments, computing device 405 may include processor circuit 402. Processor circuit 402 may be implemented using any processor or logic device. The processing circuit 402 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 402 may be connected to and communicate with the other elements of the computing system via an interconnect 443, such as one or more buses, control lines, and data lines.

In one embodiment, computing device 405 may include a memory unit 404 to couple to processor circuit 402. Memory unit 404 may be coupled to processor circuit 402 via communications bus 443, or by a dedicated communications bus between processor circuit 402 and memory unit 404, as desired for a given implementation. Memory unit 404 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 405 may include a graphics processing unit (GPU) 406, in various embodiments. The GPU 406 may include any processing unit, logic or circuitry optimized to perform graphics-related operations as well as the video decoder engines and the frame correlation engines. The GPU 406 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 406 may process any type of graphics data such as pictures, videos, programs, animation, 3D, 2D, objects images and so forth.

In some embodiments, computing device 405 may include a display controller 408. Display controller 408 may be any type of processor, controller, circuit, logic, and so forth for processing graphics information and displaying the graphics information. The display controller 408 may receive or retrieve graphics information from one or more buffers, such as buffer(s) 139. After processing the information, the display controller 408 may send the graphics information to a display.

In various embodiments, system 400 may include a transceiver 444. Transceiver 444 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 444 may operate in accordance with one or more applicable standards in any version. The embodiments are not limited in this context.

In various embodiments, computing device 405 may include a display 445. Display 445 may constitute any display device capable of displaying information received from processor circuit 402, graphics processing unit 406 and display controller 408.

In various embodiments, computing device 405 may include storage 446. Storage 446 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 446 may include technology to increase the storage performance enhanced protection for valuable digital media when multiple hard drives are included, for example. Further examples of storage 446 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 405 may include one or more I/O adapters 447. Examples of I/O adapters 447 may include Universal Serial Bus (USB) ports/adapters, IEEE 1394 Firewire ports/adapters, and so forth. The embodiments are not limited in this context.

Figure 5:
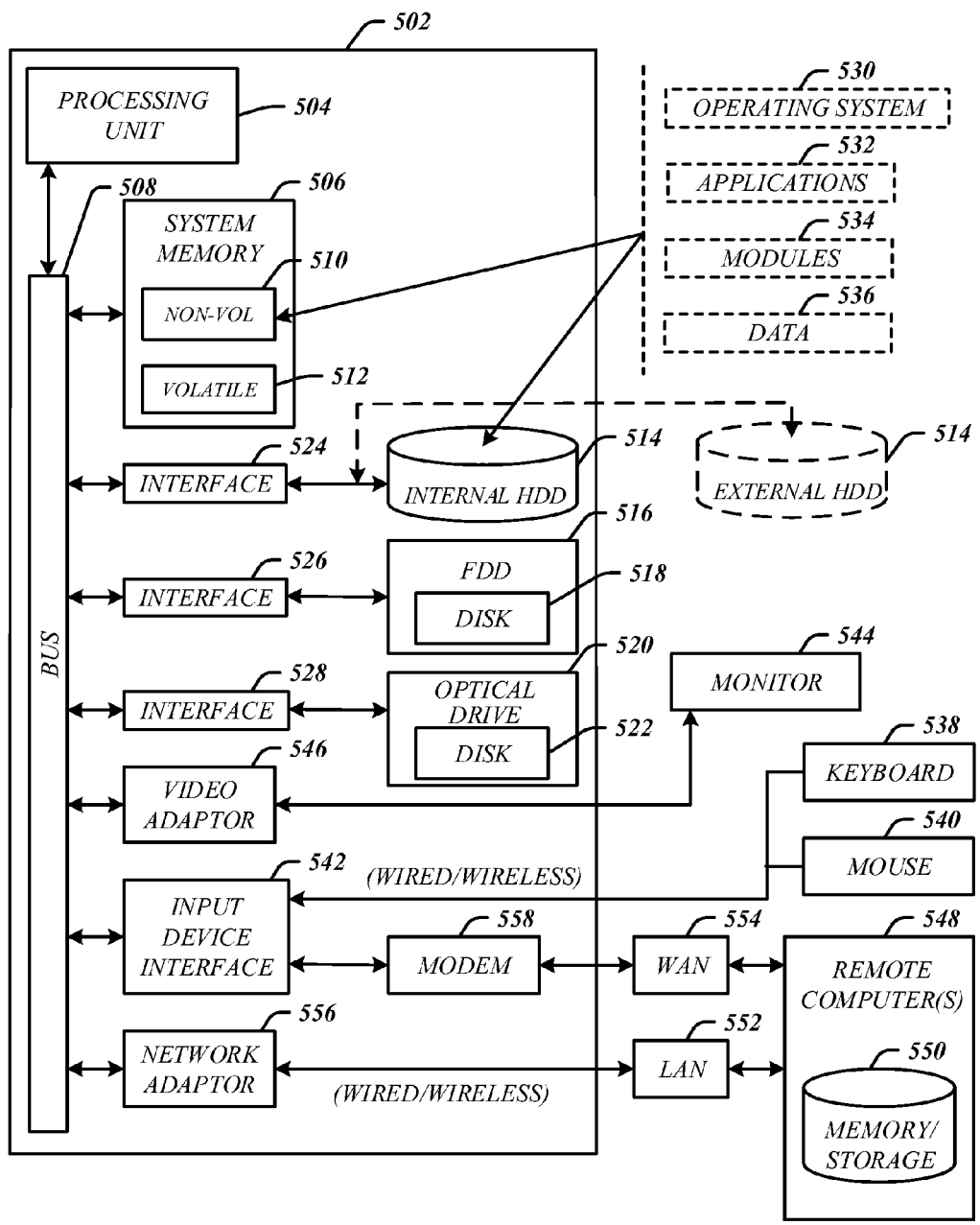
FIG. 5 illustrates an exemplary embodiment of a computing architecture.

FIG. 5 illustrates an embodiment of an exemplary computing architecture 500 suitable for implementing various embodiments as previously described. In one embodiment, the computing architecture 500 may comprise or be implemented as part of computing system, such as computing systems 100, 150 and 175.

As used in this application, the terms "system", "module" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International 500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of a system.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 502 family of standards, such as wireless devices operatively disposed in wireless communication (e.g., IEEE 502.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 502.11x (a, b, g, n, etc.) to provide secure, reliable, fast wireless connectivity. A Wi-Fi network can be used to connect computers to each other, to the Internet, and to wire networks (which use IEEE 502.3-related media and functions).

The various elements of the computing devices as previously described with reference to FIGS. 1-5 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through 33 (1-33) provided below are intended to be exemplary and non-limiting.

In a first example, a system or an apparatus having a memory comprising one or more buffers, a graphics processing unit and a shared surface control module for execution on the graphics processing unit to determine that a fast clear operation has been performed on a shared surface, wherein the fast clear operation comprising clearing one or more locations of the one or more buffers associated with the shared surface, and wherein the shared surface is shared between the first application and a second application. The system or apparatus may include a graphics pipeline for execution on the graphics processing unit, the graphics pipeline comprising a pixel shader to write pixel value information to the one or more locations of the one or more buffers and a resolve surface module for execution on the graphics processing unit to perform a resolve operation on the shared surface.

In a second example and in furtherance of the first example, a system or an apparatus may include the shared surface control module to determine that the shared surface is shared between the first application and the second application based on whether the one or buffers are shared between the first application and the second application.

In a third example and in furtherance of any of the previous examples, a system or an apparatus may include the shared surface control module to determine that the one or more buffers are shared between the first application and the second application prior to transferring ownership of the one or more buffers from the first application to the second application and the shared surface control module to transfer ownership of the one or more buffers from the first application to the second application.

In a fourth example and in furtherance of any of the previous examples, a system or an apparatus may include a fast clear module for execution on the processing unit to perform the fast clear operation on the shared surface in response to the first application requesting the shared surface to be presented.

In a fifth example and in furtherance of any of the previous examples, a system or an apparatus may include the shared surface control module to determine that the second application is a desktop compositor and a fast clear module for execution on the graphics processing unit to perform the fast clear operation on the shared surface prior to the transferring of ownership of the one or more buffers from the first application to the second application.

In a sixth example and in furtherance of any of the previous examples, a system or an apparatus may include the shared surface control module to determine that the first application and the second application are not a desktop compositor, and to set a resolve flag in response to the fast clear operation being performed on the shared surface.

In a seventh example and in furtherance of any of the previous examples, a system or an apparatus may include a fast clear module for execution on the processing unit to perform the fast clear operation on the shared surface.

In an eighth example and in furtherance of any of the previous examples, a system or an apparatus may include the resolve surface module to perform the resolve operation on the shared surface if the resolve flag is set, and to clear the resolve flag subsequent to the performing the resolve operation.

In a ninth example and in furtherance of any of the previous examples, a system or an apparatus may include a display device and a presentation module for execution on the graphics processing unit to present the shared surface on the display device.

In a tenth example and in furtherance of any of the previous examples, a method may include determining that a surface is shared between a first application and a second application as a shared surface, determining that a fast clear operation has been performed on the shared surface, the fast clear operation comprising clearing one or more locations of one or more buffers associated with the shared surface, writing pixel value information to the one or more locations of the one or more buffers and performing a resolve operation on the shared surface.

In an eleventh example and in furtherance of any of the previous examples, a method may include determining that the surface is shared between the first application and the second application based on whether the one or more buffers are shared between the first application and the second application and performing the fast clear operation on the shared surface in response to the first application requesting the shared surface to be presented.

In a twelfth example and in furtherance of any of the previous examples, a method may include determining that the one or more buffers are shared between the first application and the second application prior to transferring ownership of the one or more buffers from the first application to the second application and transferring ownership of the one or more buffers from the first application to the second application.

In a thirteenth example and in furtherance of any of the previous examples, a method may include enabling the fast clear operation on the shared surface and performing the fast clear operation on the shared surface.

In a fourteenth example and in furtherance of any of the previous examples, a method may include determining if the first application or the second application is a desktop compositor, enabling the fast clear operation on the shared surface and performing the fast clear operation on the shared surface prior to the transferring of ownership the one or more buffers from the first application to the second application if the first application or the second application is a desktop compositor.

In a fifteenth example and in furtherance of any of the previous examples, a method may include determining that the first application and the second application are not a desktop compositor, performing the fast clear operation on the shared surface; and setting a resolve flag for the shared surface in response to the fast clear operation being performed.

In a sixteenth example and in furtherance of any of the previous examples, a method may include performing the resolve operation on the shared surface if a resolve flag is set and clearing the resolve flag subsequent to the performing the resolve operation.

In a seventeenth example and in furtherance of any of the previous examples, a method may include displaying the shared surface on the display device.

In an eighteenth example and in furtherance of any of the previous examples, article may include a computer-readable storage medium having a plurality of instructions that when executed enable processing circuitry to determine that a surface is shared between a first application and a second application as a shared surface, determine that a fast clear operation has been performed on the shared surface, the fast clear operation comprising clearing one or more locations of one or more buffers associated with the shared surface, write pixel value information to the one or more locations of the one or more buffers and perform a resolve operation on the shared surface.

In a nineteenth example and in furtherance of any of the previous examples, article may include a computer-readable storage medium having a plurality of instructions that when executed enable processing circuitry to determine that the shared surface is shared between the first application and the second application based on whether the one or buffers are shared between the first application and the second application and to perform the fast clear operation on the shared surface in response to the first application requesting the shared surface to be presented.

In a twentieth example and in furtherance of any of the previous examples, article may include a computer-readable storage medium having a plurality of instructions that when executed enable processing circuitry to determine that the one or more buffers are shared between the first application and the second application prior to transferring ownership of the one or more buffers from the first application to the second application, and to transfer ownership of the one or more buffers from the first application to the second application.

In a twenty-first example and in furtherance of any of the previous examples, article may include a computer-readable storage medium having a plurality of instructions that when executed enable processing circuitry to enable the fast clear operation on the shared surface and to perform the fast clear operation on the shared surface.

In a twenty-second example and in furtherance of any of the previous examples, article may include a computer-readable storage medium having a plurality of instructions that when executed enable processing circuitry to determine if the first application or the second application is a desktop compositor, to enable the fast clear operation on the shared surface, and to perform the fast clear operation on the shared surface prior to the transferring of ownership from the first application to the second application if the first application or the second application is a desktop compositor.

In a twenty-third example and in furtherance of any of the previous examples, article may include a computer-readable storage medium having a plurality of instructions that when executed enable processing circuitry to determine that the first application and the second application are not a desktop compositor, to perform the fast clear operation on the shared surface, and to set a resolve flag for the shared surface in response to the fast clear operation being performed.

In a twenty-fourth example and in furtherance of any of the previous examples, an article may include a computer-readable storage medium having a plurality of instructions that when executed enable processing circuitry to perform the resolve operation on the shared surface if a resolve flag is set and to clear the resolve flag subsequent to the performing the resolve operation.

In a twenty-fifth example and in furtherance of any of the previous examples, article may include a computer-readable storage medium having a plurality of instructions that when executed enable processing circuitry to display the shared surface on the display device.

In a twenty-sixth example and in furtherance of any of the previous examples, an apparatus may include means for determining that a surface is shared between a first application and a second application as a shared surface, means for determining that a fast clear operation has been performed on the shared surface, the fast clear operation comprising clearing one or more locations of one or more buffers associated with the shared surface, means for writing pixel value information to the one or more locations of the one or more buffers, and means for performing a resolve operation on the shared surface.

In a twenty-seventh example and in furtherance of any of the previous examples, an apparatus may include means for determining that the shared surface is shared between the first application and the second application based on whether the one or buffers are shared between the first application and the second application, and means for performing the fast clear operation on the shared surface when the first application requests the shared surface to be presented.

In a twenty-eighth example and in furtherance of any of the previous examples, an apparatus may include means for determining that the one or more buffers are shared between the first application and the second application prior to transferring ownership of the one or more buffers from the first application to the second application and means for transferring ownership of the one or more buffers from the first application to the second application.

In a twenty-ninth example and in furtherance of any of the previous examples, an apparatus may include means for enabling the fast clear operation on the shared surface and means for performing the fast clear operation on the shared surface.

In a thirtieth example and in furtherance of any of the previous examples, an apparatus may include means for determining if the first application or the second application is a desktop compositor, means for enabling the fast clear operation on the shared surface, and means for performing the fast clear operation on the shared surface prior to the transferring of ownership of the one or more buffers from the first application to the second application if the first application or the second application is a desktop compositor.

In a thirty-first example and in furtherance of any of the previous examples, an apparatus may include means for determining that the first application and the second application are not a desktop compositor, means for performing the fast clear operation on the shared surface and means for setting a resolve flag for the shared surface in response to the fast clear operation being performed.

In a thirty-second example and in furtherance of any of the previous examples, an apparatus may include means for performing the resolve operation on the shared surface if a resolve flag is set and means for clearing the resolve flag subsequent to the performing the resolve operation.

In a thirty-third example and in furtherance of any of the previous examples, an apparatus may include means for displaying the shared surface on the display device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
 a memory comprising one or more buffers; and
 a graphics processing unit coupled to the memory, the graphics processing unit to:
  determine that a fast clear operation has been performed on a shared surface, wherein the fast clear operation comprising clearing one or more locations of the one or more buffers associated with the shared surface, and wherein the shared surface is shared between a first application and a second application;
  write pixel value information to the one or more locations of the one or more buffers; and
  perform a resolve operation on the shared surface.

2. The apparatus of claim 1, the graphics processing unit to determine that the shared surface is shared between the first application and the second application based on whether the one or more buffers are shared between the first application and the second application.

3. The apparatus of claim 2, the graphics processing unit to:
 determine that the one or more buffers are shared between the first application and the second application prior to transferring ownership of the one or more buffers from the first application to the second application; and
 transfer ownership of the one or more buffers from the first application to the second application.

4. The apparatus of claim 1, the graphics processing unit to perform the fast clear operation on the shared surface in response to the first application requesting the shared surface to be presented.

5. The apparatus of claim 1, the graphics processing unit to:
 determine that the second application is a desktop compositor; and
 perform the fast clear operation on the shared surface prior to the transferring of ownership from the first application to the second application.

6. The apparatus of claim 1, the graphics processing unit to:
 determine that the first application and the second application are not a desktop compositor; and
 set a resolve flag in response to the fast clear operation being performed on the shared surface.

7. The apparatus of claim 6, the graphics processing unit to perform the fast clear operation on the shared surface.

8. The apparatus of claim 7, the graphics processing unit to perform the resolve operation on the shared surface if the resolve flag is set, and to clear the resolve flag subsequent to the performing the resolve operation.

9. The apparatus of claim 1, comprising:
 a display device to display the shared surface.

10. A computer-implemented method, comprising:
 determining that a surface is shared between a first application and a second application as a shared surface;
 determining that a fast clear operation has been performed on the shared surface, wherein the fast clear operation comprising clearing one or more locations of one or more buffers associated with the shared surface;
 writing pixel value information to the one or more locations of the one or more buffers; and
 performing a resolve operation on the shared surface.

11. The computer-implemented method of claim 10, comprising:
 determining that the surface is shared between the first application and the second application based on whether the one or more buffers are shared between the first application and the second application; and
 performing the fast clear operation on the shared surface in response to the first application requesting the shared surface to be presented.

12. The computer-implemented method of claim 10, comprising:
 determining that the one or more buffers are shared between the first application and the second application prior to transferring ownership of the one or more buffers from the first application to the second application; and
 transferring ownership of the one or more buffers from the first application to the second application.

13. The computer-implemented method of claim 10, comprising:

enabling the fast clear operation on the shared surface; and performing the fast clear operation on the shared surface.

14. The computer-implemented method of claim 10, comprising:

determining if the first application or the second application is a desktop compositor;

enabling the fast clear operation on the shared surface; and performing the fast clear operation on the shared surface prior to the transferring of ownership of the one or more buffers from the first application to the second application if the first application or the second application is a desktop compositor.

15. The computer-implemented method of claim 10, comprising:

determining that the first application and the second application are not a desktop compositor;

performing the fast clear operation on the shared surface; and setting a resolve flag for the shared surface.

16. The computer-implemented method of claim 15, comprising:

performing the resolve operation on the shared surface if the resolve flag is set; and clearing the resolve flag subsequent to the performing the resolve operation.

17. The computer-implemented method of claim 10, comprising:

displaying the shared surface on the display device.

18. A non-transitory computer-readable storage medium comprising a plurality of instructions that when executed enable processing circuitry to:

determine that a surface is shared between a first application and a second application as a shared surface;

determine that a fast clear operation has been performed on the shared surface, wherein the fast clear operation comprising clearing one or more locations of one or more buffers associated with the shared surface;

write pixel value information to the one or more locations of the one or more buffers; and perform a resolve operation on the shared surface.

19. The non-transitory computer-readable storage medium of claim 18, comprising instructions that when executed enable the processing circuitry to:

determine that the shared surface is shared between the first application and the second application based on whether the one or buffers are shared between the first application and the second application; and perform the fast clear operation on the shared surface in response to the first application requesting the shared surface to be presented.

20. The non-transitory computer-readable storage medium of claim 18, comprising instructions that when executed enable the processing circuitry to:

determine that the one or more buffers are shared between the first application and the second application prior to transferring ownership of the one or more buffers from the first application to the second application; and transfer ownership of the one or more buffers from the first application to the second application.

21. The non-transitory computer-readable storage medium of claim 18, comprising instructions that when executed enable the processing circuitry to:

enable the fast clear operation on the shared surface; and perform the fast clear operation on the shared surface.

22. The non-transitory computer-readable storage medium of claim 18, comprising instructions that when executed enable the processing circuitry to:

determine if the first application or the second application is a desktop compositor;

enable the fast clear operation on the shared surface; and perform the fast clear operation on the shared surface prior to the transferring of ownership of the one or more buffers from the first application to the second application if the first application or the second application is a desktop compositor.

23. The non-transitory computer-readable storage medium of claim 18, comprising instructions that when executed enable the processing circuitry to:

determine that the first application and the second application are not a desktop compositor;

perform the fast clear operation on the shared surface; and set a resolve flag for the shared surface.

24. The non-transitory computer-readable storage medium of claim 23, comprising instructions that when executed enable the processing circuitry to:

perform the resolve operation on the shared surface if a resolve flag is set; and clear the resolve flag subsequent to the performing the resolve operation.

25. The non-transitory computer-readable storage medium of claim 18, comprising instructions that when executed enable the processing circuitry to:

display the shared surface on the display device.

* * * * *